W. R. TONKIN.
VEHICLE SIGNAL.
APPLICATION FILED JAN. 17, 1920.
1,339,589.
Patented May 11, 1920.
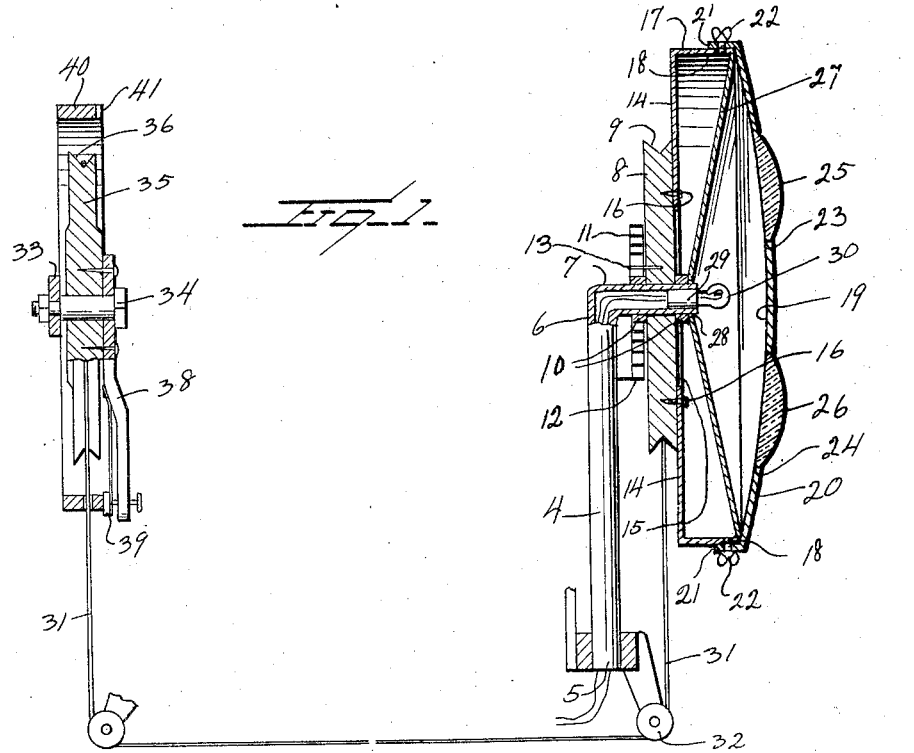
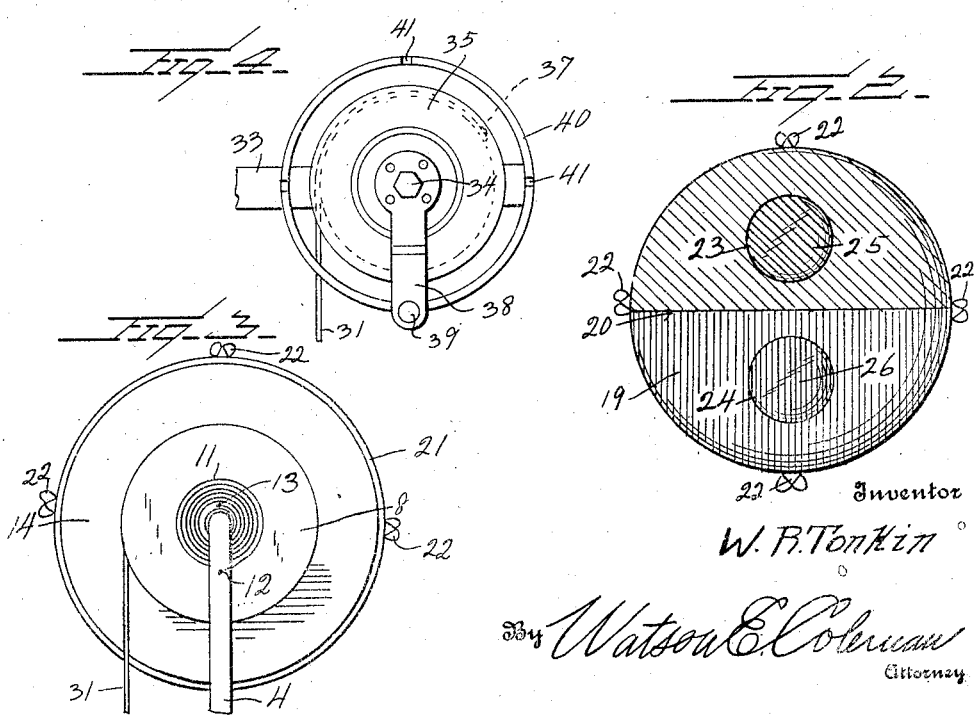
Inventor
W. R. Tonkin
By Watson E. Coleman
Attorney

UNITED STATES PATENT OFFICE.

WILLIAM R. TONKIN, OF BISBEE, ARIZONA.

VEHICLE-SIGNAL.

1,339,589.  Specification of Letters Patent.  Patented May 11, 1920.

Application filed January 17, 1920. Serial No. 352,163.

*To all whom it may concern:*

Be it known that I, WILLIAM R. TONKIN, citizen of the United States, residing at Bisbee, in the county of Cochise and State of Arizona, have invented certain new and useful Improvements in Vehicle-Signals, of which the following is a specification, reference being had to the accompanying drawings.

This invention relates to vehicle signals and has for its object to provide a device of this character which occupies a small space and can be attached to any part of the vehicle.

Another object is to provide a device of this character including a novel operating mechanism which holds the signal in its various positions.

Another object is to provide a device of this character including a support which also serves as an axle for the signal and provides a socket for the illuminating means of the signal.

Another object is to provide a device of this character in which the signal plate holder forms a casing for a reflector and illuminating means.

Another object is to provide a device of this character which is rotatable in one direction by spring means and manually rotatable in the opposite direction.

With these and other objects in view the invention consists in the improved construction and arrangement of parts to be hereinafter more particularly described, fully claimed and illustrated in the accompanying drawings, in which:—

Figure 1 is a diagrammatic and sectional view of the vehicle signal.

Fig. 2 is a front elevation of the signal.

Fig. 3 is a rear elevation of the signal.

Fig. 4 is a plan view of a controlling means of the signal.

The invention consists of a tubular supporting member 4 adapted to be secured at its lower end 5 to the rear portion of a vehicle. The end portion 6 is extended in right angular relation to the body portion 5, to provide an axle 7 for the signaling means. A drum 8 is rotatably mounted on the axle 7 and has a peripheral groove 9 the purpose of which will be hereinafter explained. The drum 8 is prevented from movement longitudinally of the axle by means of collars 10 which are secured to the axle on both sides of the drum.

In order to yieldably urge the signal in one direction, a helical spring 11 is provided, and encircles the axle 7 between one side of the drum and the body portion 4 of the supporting member. The end 12 of the spring is secured to the supporting member 4 while the end 13 is secured to the adjacent surface of the drum 8. By this means, when the drum is rotated in one direction it causes contraction of the spring 11 so that when released the latter causes rotation of the signal means in the opposite direction.

A casing 14 having a central opening 15 is secured to the other side of the drum 8 by means of screws 16, the periphery 17 of the casing being provided with a plurality of threaded openings 18. The open end of the casing 14 is closed by an opaque signal plate 19 having a convex outer surface 20 and an inwardly directed flange 21 having a plurality of set screws 22 adapted to be received in the threaded openings 18 of the casing to secure the signal plate thereto. The signal plate 19 is provided with diametrically opposed openings 23 and 24. A green bull's eye lens 25 is secured in the opening 23 while a red bull's eye lens 26 is secured in the opening 24. The plate 19 rotates with the casing, and thereby turns the desired bull's eye into position so as to signal the direction the vehicle is about to take.

A reflector 27 is disposed in the inclosure and has an opening 28 which registers with a socket 29 in the end of the axle 7. Illuminating means such as a lamp 30 is disposed in the socket 29, and serves to properly position the reflector within the casing. The wires of the lamp 30 pass through the tubular supporting member 4 to a source of energy.

In order to rotate the drum and plate in the opposite direction against the tension of the spring 11, a cable 31 is provided, and has one end secured to the drum 8 within the groove 9 and is extended by means of pulleys 32 to the front portion of the vehicle. The cable 31 is operated by the driver through the medium of a novel operating mechanism including a bracket 33 which is secured to the steering column or any portion of the vehicle within convenient reach of the driver. A bolt 34 is carried by the bracket 33 and serves as an axle for an operating drum 35. This drum is provided with a peripheral groove 36 adapted to receive the cable 31, the end 37 of the cable being secured to the drum within the groove. An operating lever 38 is secured to the drum and includes a spring pressed catch 39 which is movable over a locking ring 40. This ring surrounds the drum 35 and is provided with a plurality of spaced notches 41 adapted to receive the catch 39, whereby the various sections of the signal are locked in position.

When the driver is about to turn the vehicle, for instance to the right, the lever 38 is released by operating the catch 39, and moved to the notch in the right side of the ring 40. This causes the cable 31 to unwind from the drum 35 onto the drum 8 whereupon the spring 11 expands and rotates the red section to the right side. To indicate a left turn, the lever 38 is moved to the notch in the left side portion of the ring 40 so as to rotate the red section to the left side of the vehicle. A "stop" is indicated by moving the lever 38 to the top notch so as to position the red bull's eye 26 above the green bull's eye 25. In the last two movements, the cable 31 is unwound from the drum 8 onto the drum 35, the spring 11 being contracted at the same time. When the vehicle is moving straight ahead, the lever 38 is returned to the bottom notch in the ring 40. The cable 31 is thereby wound on the drum 8 from the drum 35, which movement causes the green bull's eye 25 to be positioned on top or above the red bull's eye 26. The driver can always ascertain the position of the red bull's eye 26 by the position of the lever 38 on the ring 40.

From the foregoing it will be readily seen that this invention provides a simple and compact form of signal which can be readily applied to any vehicle without altering the same in any manner. Another important feature is that the support of the signal performs four functions namely, that of supporting the signaling mechanism, providing an axle for the same also serving as a socket for the illuminating means and as a conduit for the wires of the lamp, so that no material is wasted.

Preferably, the one half of the signal plate 19 is colored green and the other half red corresponding to the green and the red lenses so that the plate may be easily discernible in the day time as well as at night.

What is claimed is:—

1. A direction indicator for vehicles comprising a tubular supporting member secured to the vehicle, one end portion of said member extending in right angular relation to the body portion thereof to provide a shaft, a drum rotatable on said shaft, a spring surrounding the shaft, one end of said spring being secured to the body portion of the supporting member, the other end being secured to one side of the drum, a casing secured to the other side of the drum, a signal plate carried by the casing, a reflector having its outer edges engaged with the inner surface of said signal plate, a lamp in the end of the shaft, and means for controlling the movement of the signal plate through the medium of the drum and casing.

2. A direction indicator for vehicles comprising a tubular stationary shaft secured to the vehicle, a drum rotatably mounted on the shaft, holding collars secured to the shaft on both sides of the drum, a spring surrounding the shaft in angular spaced relation thereto and secured at its ends to the drum and shaft for rotating said drum on the shaft, a casing having a central opening, said casing being secured to and movable with the drum, one end portion of the stationary shaft extending into the casing, signal means carried by the casing, illuminating means disposed in the end of the shaft within the casing, a flexible member carried by the drum and means for operating said flexible member.

In testimony whereof I hereunto affix my signature.

WILLIAM R. TONKIN.